UNITED STATES PATENT OFFICE.

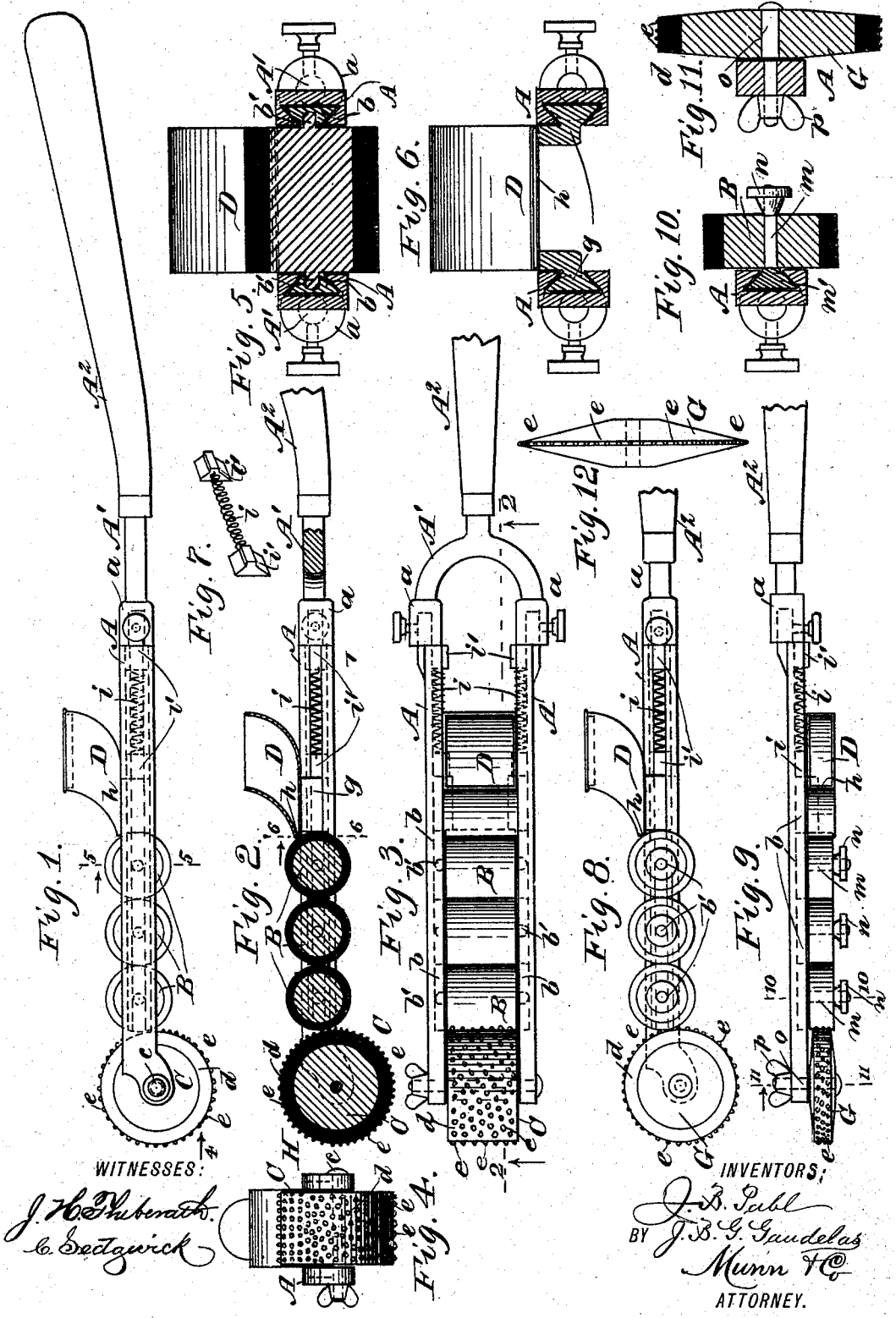

JOHN B. PABL AND JOHN B. G. GAUDELAS, OF NEW YORK, N. Y.

STIPPLING IMPLEMENT.

SPECIFICATION forming part of Letters Patent No. 477,603, dated June 21, 1892.

Application filed July 28, 1891. Serial No. 400,994. (No model.)

*To all whom it may concern:*

Be it known that we, JOHN B. PABL and JOHN B. G. GAUDELAS, citizens of the Republic of France, both of New York, in the county and State of New York, have invented a new and useful Stippling Implement, of which the following is a full, clear, and exact description.

The invention relates to a novel device for the production of artistic effects upon a surface of lithographic stone or other material that is to be subsequently etched, the object being to provide a small, light, and convenient implement which by artistic manipulation will produce designs with ink or its equivalent upon the level surface that is to be etched, the delineation being effected by a papillary surfaced roller, which is continuously coated with ink or like material as it is rotated.

To these ends our invention consists in the construction and combinations of parts, as is hereinafter described and claimed.

Reference is to be had to the accompanying drawings, forming a part of this specification, in which similar letters of reference indicate corresponding parts in all the figures.

Figure 1 is a side view of the device adapted to utilize a technic roller of considerable width. Fig. 2 is a longitudinal section of parts, taken on the line 2 2 in Fig. 3. Fig. 3 represents the top side of the implement shown in Figs. 1 and 2. Fig. 4 is an end view opposite the arrow 4 in Fig. 1. Fig. 5 is a transverse section of the form of the implement shown in Fig. 1, taken on the line 5 5 in said figure. Fig. 6 is a transverse section of parts shown in Figs. 2 and 3, taken on the line 6 6 in Fig. 2. Fig. 7 is a perspective view of detached parts. Fig. 8 is a side view of working parts of an implement analogous in form with that shown in previous figures slightly changed to lighten the frame and adapt the tool for a narrow impression-roller. Fig. 9 is a top view of the implement constructed as shown in Fig. 8. Fig. 10 is an enlarged transverse section of parts indicated on the line 10 10 in Fig. 9. Fig. 11 is a cross-section on the line 11 11 in Fig. 9, and Fig. 12 is an edge view of a thin-edged impression-roller to be used with the parts shown in Fig. 9.

In Figs. 1, 2, and 3, which represent the construction preferably employed when the implement is to be used upon large surfaces, where an impression-roller of considerable area may be best employed to effect a rapid execution of the work, there is a frame provided for the device, having two similar parallel limbs A of a suitable length to receive and support working parts. Said limbs A are removably secured in the sockets $a$, that are terminal ends of a bifurcated handle-bar A', whereon a handle-piece A² is affixed for the manipulation of the device. The inner sides of the frame-limbs A are longitudinally grooved in a manner that will retain a series of boxes $b$ (indicated by dotted lines in Fig. 3) and permit said boxes to slide endwise therein.

Opposite perforations are made in each pair of boxes $b$, as shown in Fig. 5, wherein the journal ends $b'$ of a series of ink-distributing rollers B are loosely supported. Said rollers, having about an equal diameter, are enveloped with a slightly-elastic coating that is adapted to receive and transfer ink of a proper consistency.

Between the front ends of the limbs A a larger roller C is rotatably supported by a removable pintle-bolt $c$. This roller, which may be given different forms to suit the nature of the work it is to be used upon, is shown cylindric in Figs. 1 to 4, inclusive, and has a slightly-elastic facing $d$ secured upon it to afford a working face therefor. The enveloping-facing $d$ is rendered papillary on its entire cylindric exterior, these numerous independent projections $e$ being made larger or smaller, cone-pointed, or slightly-rounded on the points to suit the character of stippling effects desired and afford an impression-surface for the transfer of ink in dots from the points of the papilla to the plate, paper, or stone whereon a design is to be executed.

Directly behind the rear ink-distributing roller B an ink-fount D is located, which is adapted to slide longitudinally on the frame-bars A, its engagement therewith being produced by providing dovetailed ears $g$, which laterally project from the lower portion of the fount and are loosely inserted in the longitudinal grooves of the frame-bars, as shown in Fig. 6. The fount D is contracted below and forwardly, as at $h$ in Fig. 2, so as to afford a thin transverse slitted opening adjacent to the face of the nearest ink-distributing roller B, so that when the fount and roller are in contact a continuous supply of ink will exude from the fount and coat the roller-face. The fount D and rollers B are pressed toward the roller C by springs $i$, that have their ends secured to blocks $i'$, the latter having a proper form to adapt them to slide in the grooves of the limbs A, one of said springs and attached blocks being shown detached in Fig. 7.

In Figs. 8 and 9 a slightly-changed construction is shown, which is preferred when a narrow-faced impression-roller is to be employed, there being a single frame-limb A used in this form of the device, which is removably secured in a socket that is similar to the sockets A, previously mentioned, and which serves to connect the frame-limb with a handle $A^2$, shown broken.

There are ink-distributing rollers B provided, that are the same in shape as those used on the device previously described, which rollers are rotatably sustained by their loose engagement with the studs $m$, (see Fig. 10,) each having a head $m'$ shaped to slide in the dovetail groove formed longitudinally in the frame-bar, as before explained, the rollers being held in place, preferably, by the coniform nuts $n$.

Upon the forward end of the single frame-bar B an impression-roller G is supported free to rotate by a laterally-inserted stud-bolt $o$, that passes through both the roller and limb and is removably secured thereto by a winged nut $p$. The impression-roller G may be of different face-widths to suit the character of impressions to be produced on the lithographic plate, paper, or stone, as represented in Figs. 11 and 12, said rollers in all widths having papillary projections to produce stippled effects on the stone, as before mentioned.

Ink or a like material is fed to the rollers B on the single-limb implement from a fount D of like form with the fount on the double-limbed device, which is spring-actuated forwardly in a like manner, so that ink which is delivered from the fount D will be evenly distributed upon the faces of the series of rollers B, and thence upon the impression-rollers C or G when the same is progressively moved upon the plain surface of a stone or plate in the technic manipulation of the tool to produce desired effects thereon.

Having thus described our invention, what we claim as new, and desire to secure by Letters Patent, is—

1. In a stippling implement, the combination, with a frame having a handle, of a pivoted impression-roller having a papillary surface, sliding ink-distributing rollers, and sliding ink-supplying fount, substantially as described.

2. In a stippling implement, the combination, with a frame, a handle from which the frame is detachable, and a detachable pivoted impression-roller having an enveloping slightly-elastic jacket that is covered with papillary projections, of ink-distributing rollers arranged to slide in sequence on the frame, an ink-fount, also adapted to slide on the frame, and springs that press the fount toward the impression-roller, with the distributing-rollers located intermediately, substantially as described.

3. In a stippling implement, the combination, with a frame having two parallel limbs that are held removably in a fork-handled shank, a series of ink-distributing rollers longitudinally movable in grooves of the frame-limbs, an ink-supplying fount adapted to slide between the frame-limbs, and two springs thereon, of a pivoted removable roller having a slightly-elastic surface which is covered with papillary projections, substantially as described.

JOHN B. PABL.
JOHN B. G. GAUDELAS.

Witnesses:
WM. P. PATTON,
C. SEDGWICK.